United States Patent

Ford et al.

[15] 3,699,808
[45] Oct. 24, 1972

[54] DYNAMIC TESTING DEVICE FOR VISCO-ELASTIC MATERIALS

[72] Inventors: Bryce W. Ford, Kent; Daniel A. Meyer, Akron; Walter C. Warner, Hudson, all of Ohio

[73] Assignee: The General Tire & Rubber Company

[22] Filed: Oct. 13, 1971

[21] Appl. No.: 188,920

[52] U.S. Cl. .................................... 73/91, 73/67.2
[51] Int. Cl. ............................................. G01n 3/38
[58] Field of Search ............. 73/91, 67.2, 67, 15.6, 92

[56] References Cited

UNITED STATES PATENTS 3,039,297   6/1962   Peter et al. ............. 73/15.6 X
3,550,427   12/1970   Sueyoshi ................. 73/15.6

Primary Examiner—Jerry W. Myracle
Attorney—Frank C. Rote, Jr. et al.

[57] ABSTRACT

A testing device for obtaining dynamic properties of visco-elastic materials is adapted for testing in shear or compression. The device which imposes sinusoidal deformation upon the specimen permits testing over wide ranges of temperatures and frequencies. The displacement and force developed in the specimen are sensed by suitable transducers and with the aid of appropriate controls and instrumentation, the total or complex modulus of the material is found along with its "loss" or phase angle.

10 Claims, 10 Drawing Figures

PATENTED OCT 24 1972

INVENTORS
BRYCE W. FORD
DANIEL A. MEYER
BY WALTER C. WARNER

Harry F. Pepper, Jr
ATTORNEY

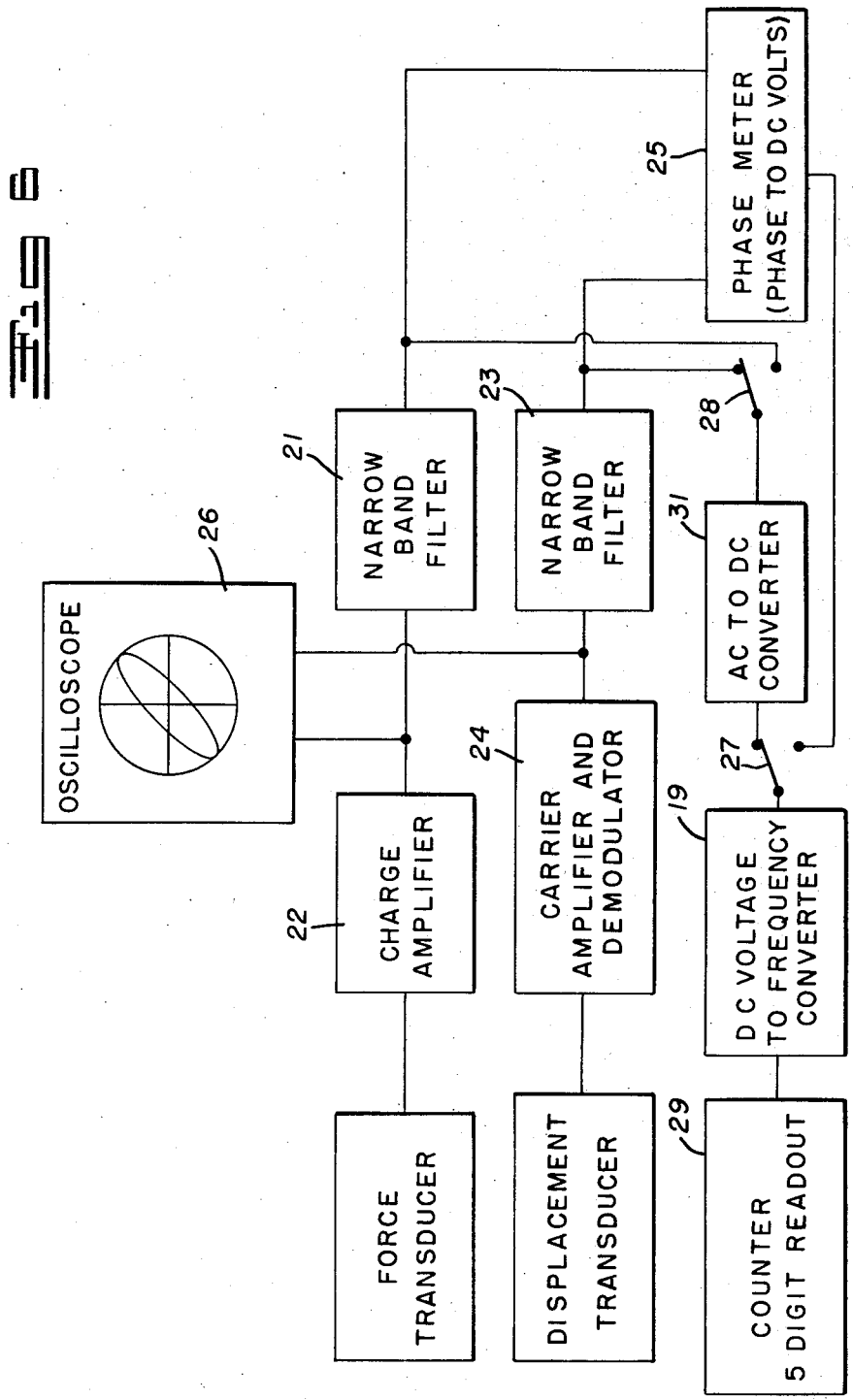

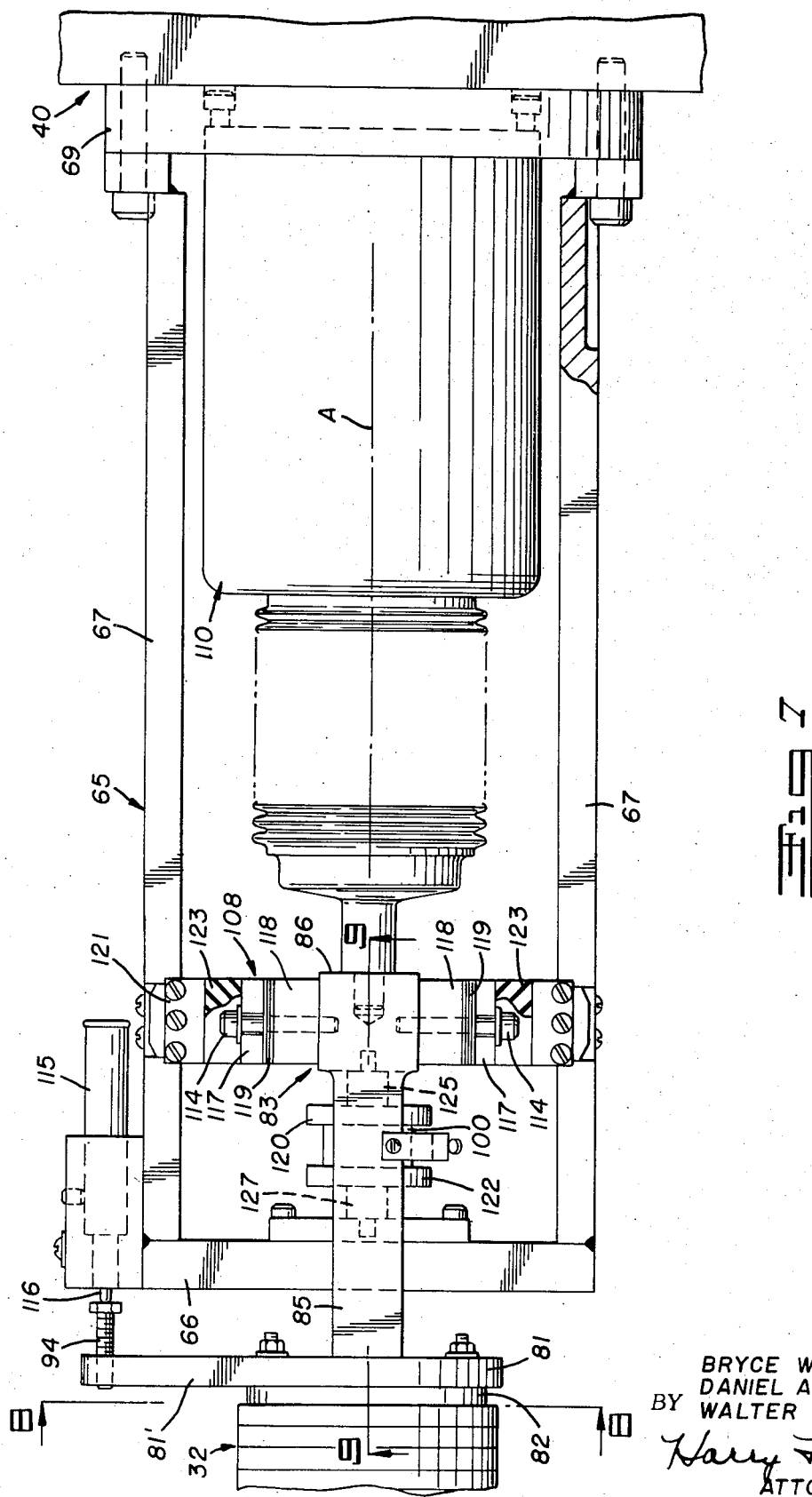

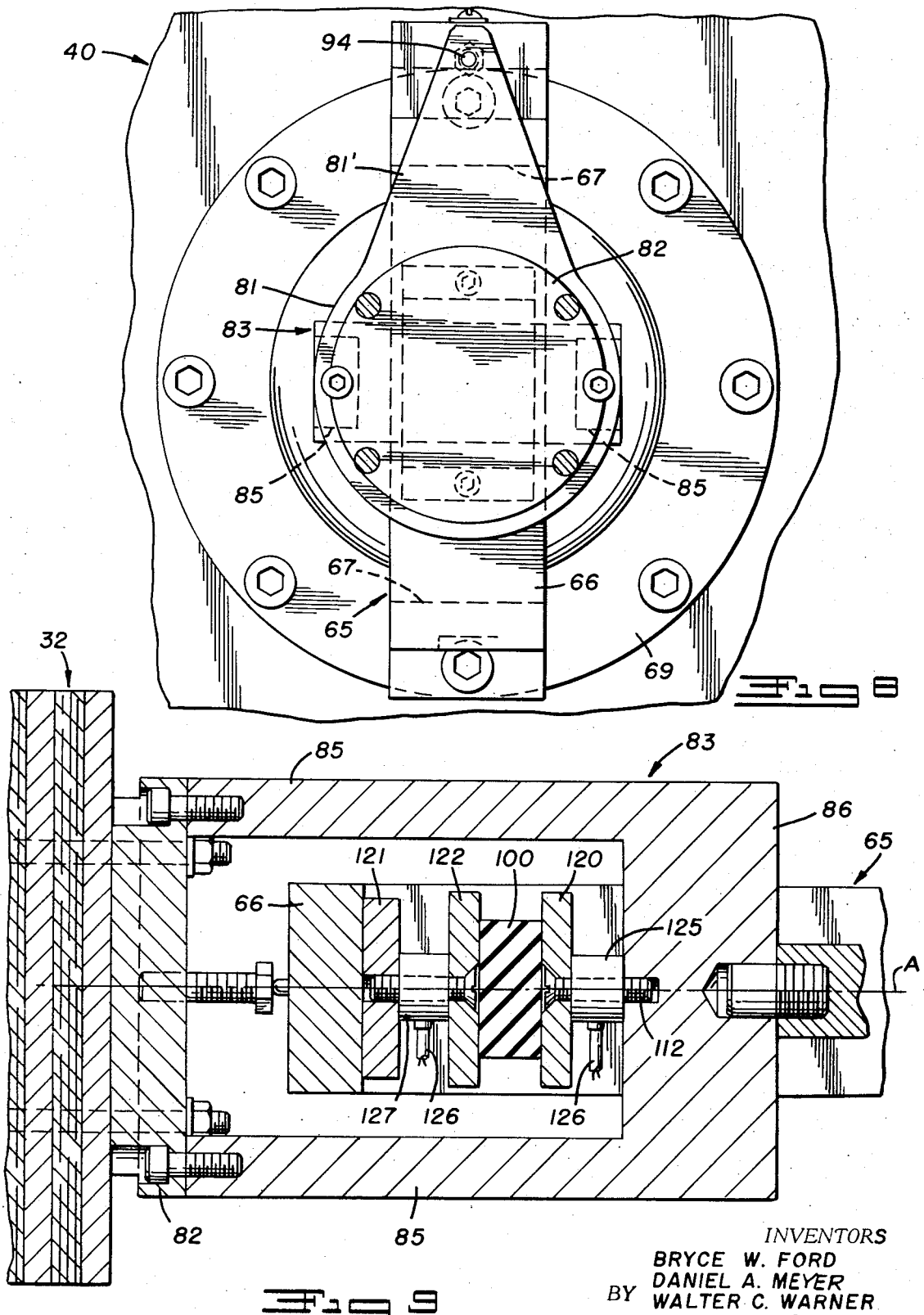

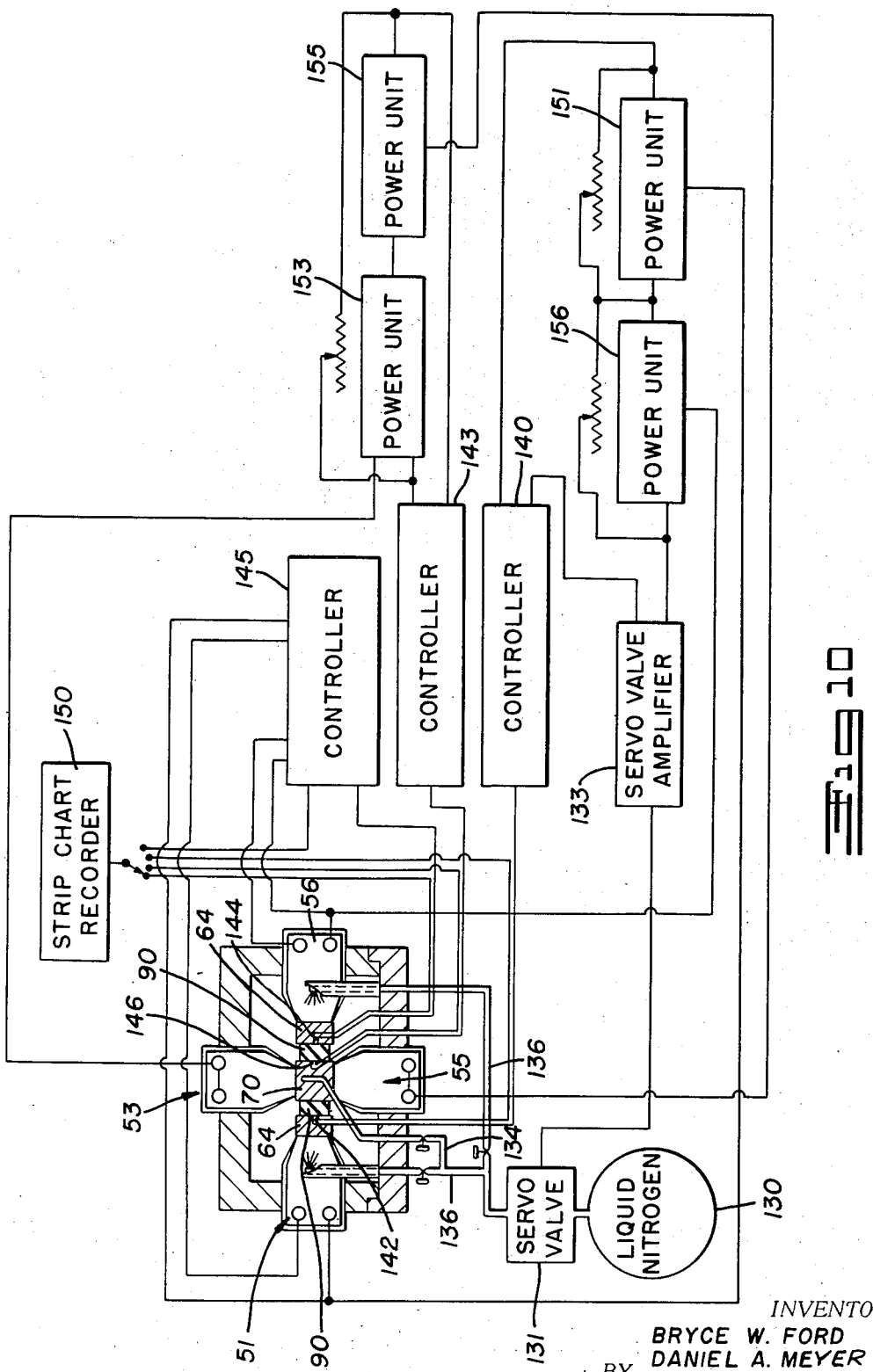

DYNAMIC TESTING DEVICE FOR VISCO-ELASTIC MATERIALS

BACKGROUND OF THE INVENTION

Product manufacturers are becoming increasingly involved in dynamic testing of products and the materials which comprise such products. This testing is becoming more necessary in research and development activities as well as in meeting customers' detailed requirements.

A common property of interest for products or materials in this regard is modulus, or more accurately, dynamic modulus. To determine modulus, an appropriate test specimen is usually subjected to a dynamic strain or deformation, with modulus being calculated by dividing the stress in the specimen by the imposed strain. This basic relationship holds true regardless of the type of deformation imposed on the specimen (e.g. tension and/or compression or shear).

In shear, stress and strain are more homogeneous, particularly at low shear strain. Shear permits a choice in specimen shapes where no "buckling" and "barreling" or "necking" might occur as in compression or tension respectively. In shear, there is little tendency for a volume change in the specimen. Also, a linear relationship exists between displacement of the moving member and the force on the specimen over a wider range of strain.

Currently, however, compression and/or tension tests are popular because specimen preparation and the equipment used is basically simpler than that necessary for shear tests. Also, the customers of the product manufacturers normally require products with dynamic specifications based on dynamic compression and/or tension properties.

In the case of a polymeric solid, such as rubber, modulus obtained by dynamic testing is termed "total" or "complex" modulus. Because a vulcanized polymer or vulcanizate is both viscous and elastic by nature, within the total or complex modulus exists an elastic and viscous component. This elastic component is variably termed "elastic", "real", "storage" or "in-phase" modulus, while the viscous component is variably termed "viscous", "imaginary", "loss" or "out-of-phase" modulus respectively. Imposing a sinusoidally varying strain or deformation upon a vulcanizate finds the imposed stress or force of the specimen lagging the imposed strain or deformation by a "phase" or "loss" angle. It thus becomes advantageous for the manufacturer and users of products comprising visco-elastic materials to be made aware not only of a product's complex dynamic modulus but the elastic and viscous components thereof.

Taking dynamic shear as an example, complex modulus is sometimes given the symbol $G^*$ and the elastic and viscous components thereof symbolized by $G'$ and $G''$ respectively. Mathematically expressed, $G^*$ is the vector sum of $G'$ and $G''$. If the phase or loss angle relating $G'$ and $G''$ is $\alpha$, $\tan \alpha = G''/G'$. Utilizing known trigometric identities it is seen that when any two of $G^*$, $G''$, $G'$, $\alpha$, or $\tan \alpha$ are known the others are known.

Dynamic testing apparatus for visco-elastic materials and products are available for both resonant and non-resonant test methods. There is no one presently available machine capable of accommodating a wide range of testing deformations or strains, frequencies and temperatures, which may be changed quickly and conveniently. In other words, testing machines presently are substantially limited in respect of one or more of these important testing parameters, which can have a direct influence upon the dynamic behavior of visco-elastic materials.

SUMMARY OF THE INVENTION

It is an object of this invention to provide a dynamic testing device for visco-elastic materials adapted to test such materials in shear or compression.

It is another object to provide a dynamic testing device having quickly changeable strain amplitudes, frequencies and testing temperatures over wide ranges.

It is still a further object to provide a dynamic testing device for visco-elastic material which is highly accurate and precise.

It is another object to provide a dynamic testing device where temperature gradients within the sample are controlled or minimized.

It is still another object to provide a machine capable of dynamically testing visco-elastic materials with minimal thermal, electronic and/or mechanical interference among the components thereof.

These and other objects are achieved through a machine design utilizing an electrodynamic vibration exciter to transmit sinusoidal vibrations to a specimen mounted on a floating frame. The transmitted vibrations work against the presence of an "infinite" mass of sufficient magnitude as to remain substantially immovable in response to vibrations of the exciter. The machine is adapted to mount test specimens for testing in shear and compression by interchangeable shear and compression mounting fixtures. An environmental chamber or shroud is provided which can surround the specimen being tested isolating it from the surroundings and which is adapted for internal temperature control over a wide range of temperatures.

BRIEF DESCRIPTION OF THE DRAWINGS

FIG. 5 is a view along lines 5—5 of FIG. 2 illustrating the specimen engaging surface of one of the test specimen mounting members for testing in shear.

FIG. 6 is a simplified schematic diagram indicating generally the manner in which readings are taken for the shear test.

FIG. 7 is a partial top view of the test machine wherein the specimen mounting fixture has been changed in order to provide for testing in compression.

FIG. 8 is a sectional view along lines 8—8 in FIG. 7.

FIG. 9 is a sectional view taken along lines 9—9 in FIG. 7.

FIG. 10 is a simplified schematic representation of the some of the controls and recording circuitry which can be used when testing is conducted at different temperatures.

DETAILED DESCRIPTION

Figure 1:
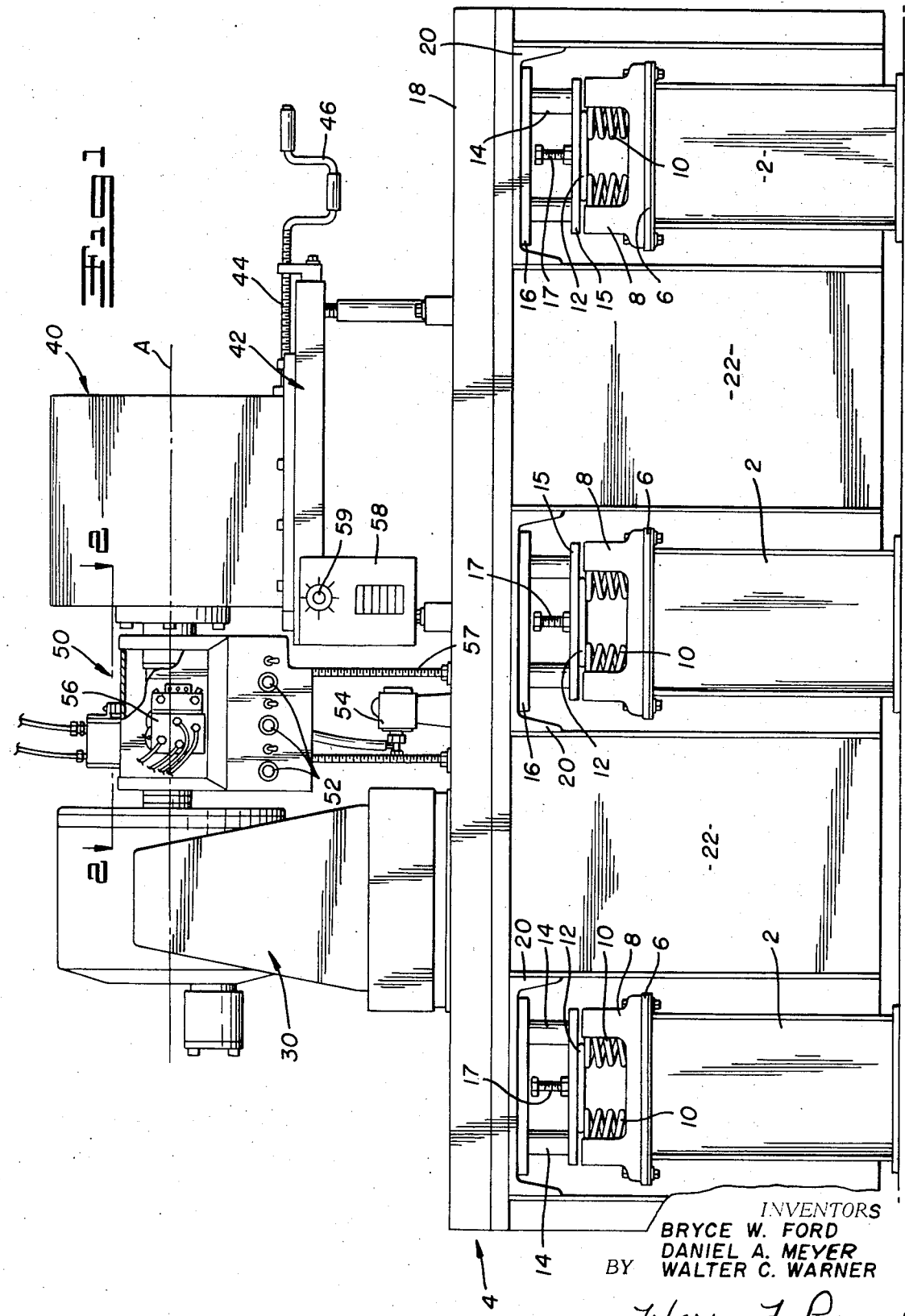
FIG. 1 is an elevation of the machine according to a preferred embodiment of the present invention.

In the drawings which illustrate the testing device of the present invention according to preferred embodiments, the same reference numerals have been used to refer to similar details throughout the several views. FIGS. 1 through 6 and 10 depict the more important details of the machine as it is preferably adapted for shear testing, while FIGS. 7 through 9 show details of the machine adapted for compression testing. It will be evident from the following discussion that several components of the machine remain substantially unchanged with regard to either adaptation.

In FIG. 1, a floating support or "seismic" pad, indicated generally as 4, is supported by a foundation comprising a series of vertical pillars 2, each having a base plate 6 bolted or otherwise secured to the top portion thereof. Each base plate 6 is provided with spring guard extensions 8 for protecting a pair of heavy steel coil springs 10 extending vertically from each base plate 6. The upper ends of each spring in each set of springs 10 engage the underside of an adjustable plate 12 connected by rigid vertical columns 14 to a second plate 16. An adjustment plate 15 disposed intermediate plates 12 and 16 is threaded therethrough and carries an adjustment screw 17 which engages plate 12. Turning screw 17 adjusts plate 12 in order to vary the tension of springs 10 for leveling the seismic pad. The seismic pad 4 of the machine rests on these upper plates 16 and thereby is substantially physically isolated from any mechanical interference from the surroundings.

The particular manner shown whereby the mounting frame or pad 4 is isolated or floatingly supported is not critical in and of itself but is one design found suitable to achieve the desired and necessary result of nearly complete isolation.

The seismic pad 4 is preferably a large mass of concrete and steel. The upper surface is composed of two layers of steel plate 18 mounted to steel beam cross members 20 which are supported on plates 16. Preferably the remaining areas, such as for example, the areas 22 between columns 2, are filled with reinforced concrete to add to the large overall mass desired.

An electromagnetic vibration exciter 30 or "shaker" is bolted to the upper steel plate 18 of support pad 4 and situated to impart vibrations or oscillations along a horizontal axis A to a test specimen (not shown). This vibrator can be one of several commercially available devices. For example, an Unholz-Dickie "exciter" model 106 has been found highly suitable for this machine because of its capability of sinusoidal motion through an easily changeable wide range of frequencies.

Axially spaced from the vibrator 30 is a large steel block 40 which based upon forces developed in the testing procedures involved and in this description can be referred to as an "infinite" mass. The "infinite" mass is in fact of such magnitude as to remain substantially immovable despite vibrations of the exciter through all its operating frequencies.

Mass 40 rests on a flat steel table 42, the legs of which are secured to seismic pad 4 as shown. An adjustment rod 44, with crank arm 46 is used to axially adjust the distance between mass 40 and exciter 30.

Between mass 40 and exciter 30 is the specimen testing ensemble. The details of the test specimen mounting fixture are not shown in FIG. 1, but will be described in more detail hereinafter. The ensemble in FIG. 1 includes an environmental chamber or shroud 50 enclosing and insulating the test specimen from ambient conditions. A series of manual valves such as 52 are provided for introduction of a suitable cooling fluid such as for example liquid nitrogen. Flow of fluid through each valve can be metered by appropriate adjustments, with the entire flow system being controlled by a main servo control valve 54. Four radiant heaters, such as 56, each of variable intensity, are mounted in the bottom, top and side walls of chamber 50 to direct heat toward the test specimen. Both heating and cooling are controlled through an appropriate thermocouple control not shown provided with a readout thermocouple selector dial 59. The chamber 50 is mounted on adjustable legs 57 because the size and shape of the chamber can differ for different types of tests.

SHEAR TEST FIXTURE

As stated previously, FIG. 1 illustrates the machine according to the present invention adapted for testing an appropriate specimen in shear. Thus, a shear test fixture is situated between the electrodynamic exciter 30 and the "infinite mass" 40, the details of which are not shown in FIG. 1 due to the illustration of environmental chamber 50. FIGS. 2 through 6, however, show the more pertinent details of a preferred embodiment of this fixture adapted to test an appropriate specimen in shear.

Figure 2:
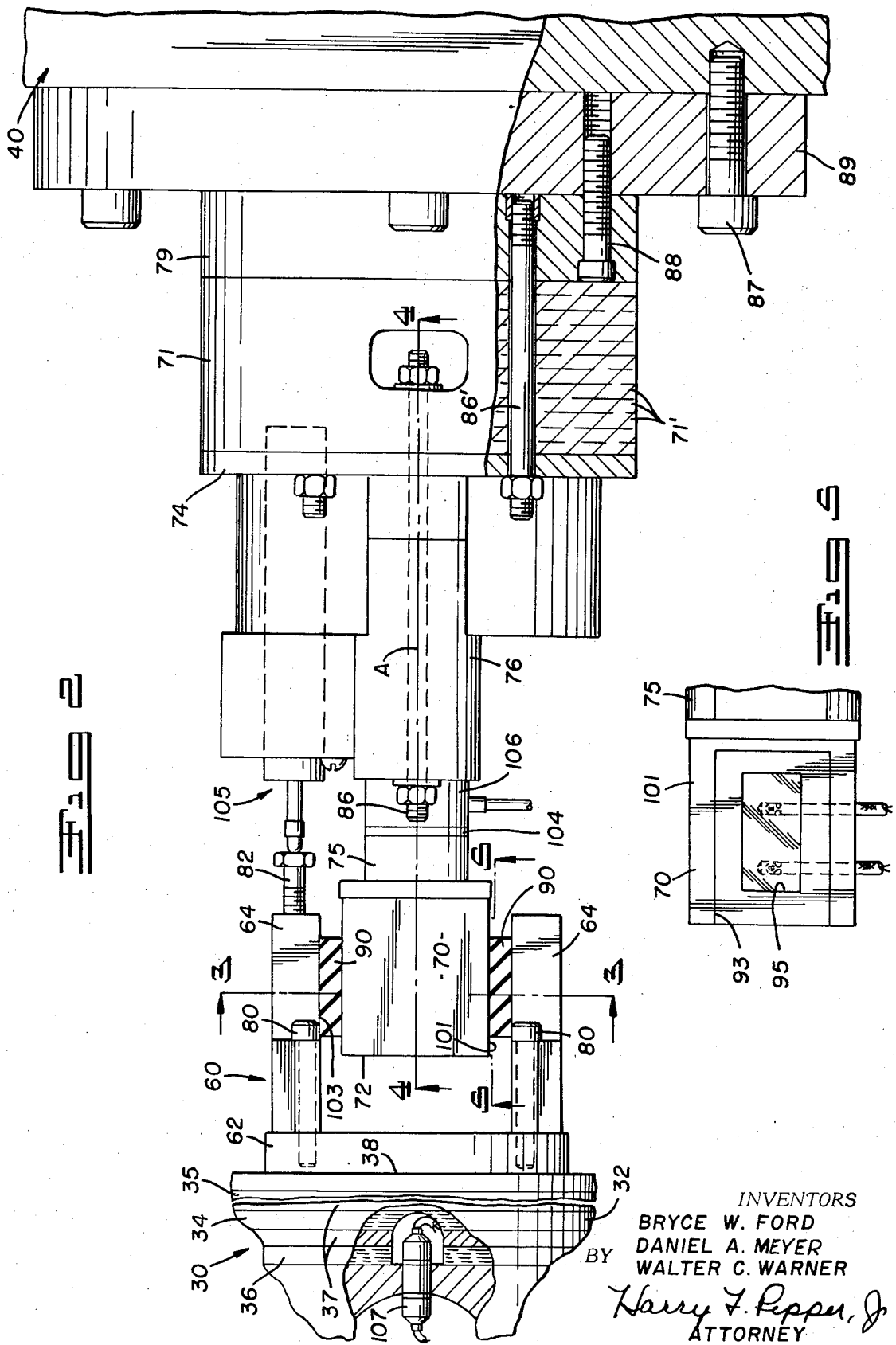
FIG. 2 is a top view of a portion of the machine along lines 2—2 of FIG. 1, said machine being set up for shear tests.

Referring initially to FIG. 2, the shear test fixture comprises a yoke 60 composed of an annular metal plate 62 bolted or otherwise secured to the vibration transmitting member or "head" 32 of the electrodynamic exciter 30. The yoke 60 further includes two spaced axially extending arms 64, each substantially parallel to axis A and secured to annular plate 62 by a pair of cap screws 80. The yoke 60 forms the movable mounting member of the shear test fixture and is positioned so that each arm 64 contacts the outer surface of each of a pair of spaced visco-elastic test specimens 90.

Figure 3:
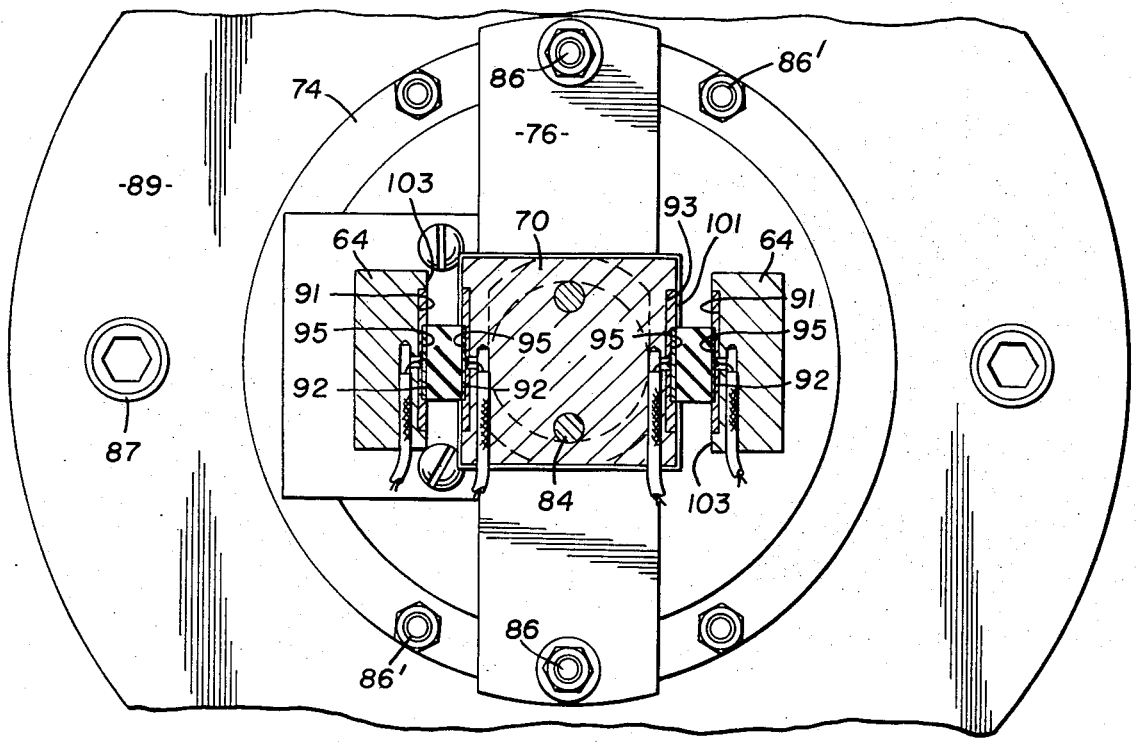
FIG. 3 is a sectional view taken along lines 3—3 of FIG. 2.
Figure 4:
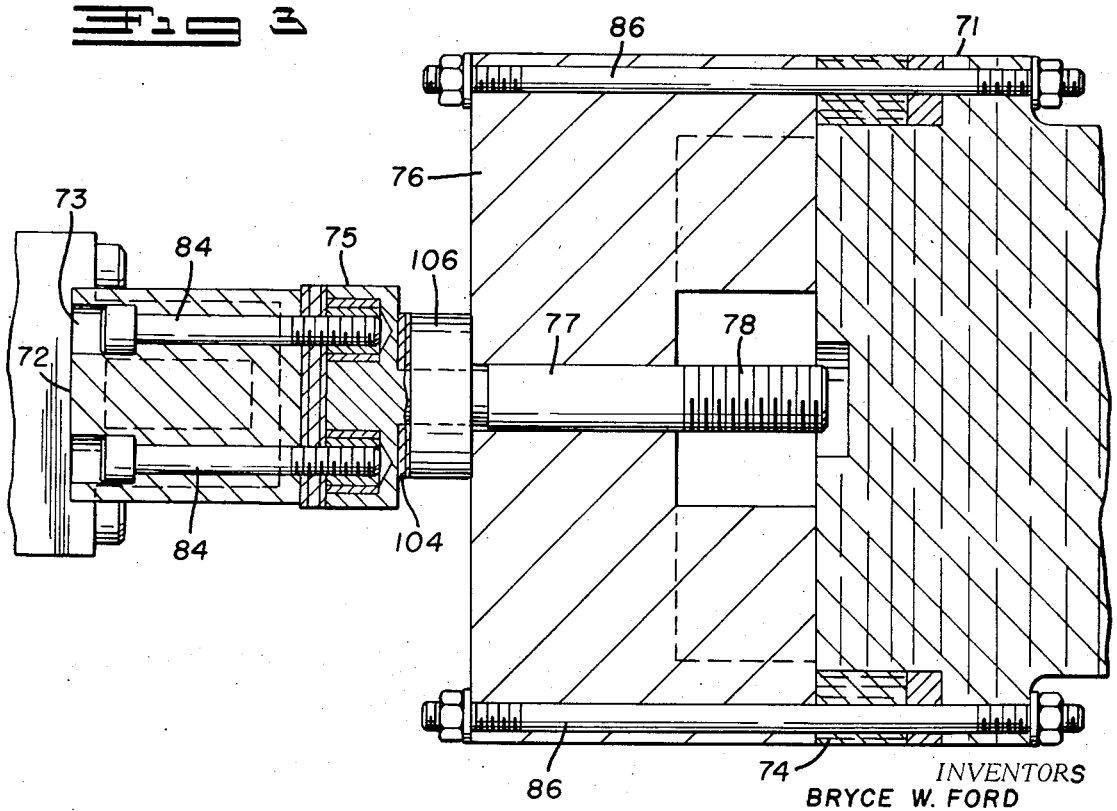
FIG. 4 is another sectional view of the machine taken along lines 4—4 of FIG. 2.

The stationary mounting member of the shear test fixture for both test specimens 90 is a single center mount or paddle member 70. The center mount 70 as seen in FIGS. 2, 3 and 4 is a rigid block of rectangular cross-section, having a front face 72 provided with a pair of counter-sunk bolt openings 73 dimensioned to receive a pair of bolts 84. The bolts 84 secure the stationary or center mount 70 to a tie rod 75 having a central extension 77 with a threaded end 78. The stationary mounting member or center mount 70 is further secured by bolts 84 and tie rod 75 to a steel "U-shaped" clamp 76. U-shaped clamp 76 is secured to the reduced diameter end of block of micarta insulation 71 by bolts 86 which pass through a steel ring 74. Ring 74 is bolted to spacer plate 79 by bolts 86' which pass through the enlarged portion of the block of micarta insulation 71. A series of cap screws 88, registering through spacer plate 79 secure the entire stationary assembly to an end plate 89 secured to "infinite mass" 40 by another series of cap screws 87. The principal purpose of this arrangement is to provide a rigid link to the large mass, as well as thermal and electrical isolation.

The details described above are related to the shear test system according to a preferred embodiment. The particular means described to mount the test specimen and the several interconnecting members or elements of the shear test fixture were chosen due to considerations as to the characteristics of the deformation to be imposed. These considerations are how to impose a pure sinusoidal smoothly varying shear deformation which is characterized by (1) no extraneous vibrations in undesired directions, (2) no extraneous vibrations at other frequencies, (3) relative freedom from any static stress, and (4) homogeneity throughout the material.

The choice of the yoke and center mount members as described are based upon this first characteristic. Thus, the yoke 60 driven by the exciter 30 with the center mount 70 held stationary by the "infinite" mass 40 produces a very good uniaxial motion and allows any reaction torques due to the shearing forces to be canceled.

The several members or elements connecting the shear test fixture with the exciter 30 and the mass 40 respectively are made so as to eliminate any undesirable frequencies caused by standing waves. These undesirable frequencies can occur or will occur only at higher frequencies. These members are thus made as short in length as possible. Thus, the shorter in length these members are, the higher will be the frequency necessary for the existence of standing force waves therein. Further, the elimination of extraneous vibrations dictate use of the kind of material from which these members are made. The kind of material is preferably selected from those materials which have a high rigidity to weight ratio.

To free the shear test system from any static stress specially mounting the specimens 90 between the yoke and center mount is considered necessary. Referring to FIG. 2, it is seen that each specimen 90 is mounted between an inner face 103 of a yoke arm and one of the side faces 101 of center mount 70. As seen in FIGS. 3 and 5, the interfaces 103 of the yoke arms 64 are provided with rectangular recesses 91. The center mount 70 also is provided with similar recesses 93, one on each of its side face 101. Within each of the recesses 91 and 93 is a sheet of micarta to thermally insulate the specimen from the rest of the system. Each recess 91 and 93 has a smaller recess 95 dimensioned to receive the specimens 90 in contact along the side faces thereof.

The specimens 90 are mounted between the faces 101 and 103 of the yoke and center mount by bonding within these recesses 95 under little or no static compression. Accordingly, thin copper sheets or facings 92 are molded or cured to the surfaces of the rubber specimens 90. These copper sheets or facings 92 hold the samples in shape while being bonded into the recesses 95 under slight compression. The micarta to copper bond holds well under stresses which normally would fail with a direct rubber to micarta bond.

It may be desirable to secure an additional thin copper sheet (not shown) within recess 95 prior to bonding the specimens 90 with their thin copper facings 92 into recesses 95. In such case there is a better heat distribution along the recess 95 and a copper to copper bond exists between specimen 90 and recess 95. This copper to copper bond also holds well under the stresses aforementioned and further provides for more convenient removal of the sample.

The fourth characteristic, i.e., that of imposing uniform stress throughout the material, involves an exacting choice of sample shape. This shape is selected so as to eliminate as nearly as possible any bending superimposed on the shear deformation. The sample size is also important in order to cut down as nearly as possible the temperature gradients which may be set up and yet provide a material volume necessary for the determination of the properties sought. Dimensions found suitable in many tests are samples being one-fourth inch high (normal to the motion), one-half inch wide (normal to the motion), and 1 inch long (parallel to the motion). However, this choice is somewhat arbitrary and may be departed from depending upon many considerations, such as the type of compound, the ultimate use of the compound, and the frequency and properties sought in the test. Also, when temperature gradients are unimportant, other dimensional considerations may be made.

The four quantities used to accurately characterize the specimen 90 according to its physical properties are frequency, stress amplitude, strain amplitude, and phase at any given temperature. Because the exciter is imposing a sinusoidal shear deformation or strain upon the specimen, the sinusoidal stress generated on the specimen is out of phase with the strain. In other words, the stress amplitude reaches a maximum or a minimum at some fixed time interval after the strain has reached its maximum or minimum. Thus, phase is a time lag which can be expressed as a fraction of the period of oscillation.

Voltage, frequency, and phase meters are available to make these measurements if the instantaneous force on and displacement of the center mount 70 is converted to a proportional electrical signal. The transducers selected to make such measurements must be such as to eliminate as much as possible signals representing deformation or the forces developed in the test instrument and the transducers themselves. Secondly, transducers chosen should be capable of handling all ranges of force and displacement which may occur. Further, the transducers are to be unaffected by or protected from any adverse thermal conditions which may exist.

As seen in FIG. 2, one of the arms 64 of yoke 60 is provided with an axial extension such as a machine screw 82. This machine screw contacts the movable extension of a linear variable differential transformer (LVDT) generally indicated 105. This LVDT 105 can measure directly the relative displacement of the yoke 60 with respect to the center mount 70. It is understood that the LVDT 105 may be mounted in positions other than shown in FIG. 2. The basic consideration in selecting where and how the LVDT is to be mounted is where the most effective and convenient position whereby its function in measuring relative displacement between the yoke and center mount is to be found.

The LVDT 105 requires proper calibration. One suitable procedure is to calibrate LVDT 105 dynamically by using a Filar microscope to view a stage micrometer temporarily secured to the moving part of the machine or assembly and illuminate the same by a stroboscope.

As also shown in FIG. 2, the end of the shaker head 32 is provided with two accelerometers 107 and 109. One of these accelerometers is selected as a "reference" accelerometer while the other is selected as the measuring accelerometer. For purposes of this description, accelerometer 109 will be termed the measuring accelerometer and accelerometer 107 will be termed the reference accelerometer. The measuring accelerometer 109 is thus adapted to measure absolute displacement of the yoke 64.

A force transducer or load washer 106 is mounted on the stationary side of the fixture axially rearwardly of center mount 70. It is preferred that this force transducer 106 be as stiff as possible and the mass between it and the specimen be as light as possible. Therefore, a force transducer of the piezo-electric type is chosen because of its stiffness. Also magnesium is a suitable choice as the material for center mount 70.

This force transducer or load cell 106 also requires proper calibration. A suitable procedure is to calibrate the cell before installing the entire assembly. The entire assembly from micarta insulation 71 through annular plate 62 is placed on seismic pad 4 such that the assembly rests on insulation 71. An adaptor is inserted through annular plate 62 such that a force of 5 pounds rests on paddle member 70. This weight is added and removed several times to insure correct calibration of load cell 106. After this static force calibration, dynamic calibration may be accomplished by periodically mounting a specially designed proof ring on the machine instead of a test specimen, said proof ring having a spring rate known from a previous static measurement. Because dynamic and static spring rates of the proof ring are equivalent for test frequencies when a known dynamic displacement is applied, a known dynamic force will be generated by the proof ring.

The center mount 70 is not in direct contact with force transducer 106 but is separated from it by a collar member 104 which protects transducer 106 from side loads and introduces a preload upon it.

Absolute displacement of the yoke 60 measured by one of the accelerometers 107 or 109 compared with the relative displacement of the yoke 60 with respect to the center mount 70 as measured by the LVDT 105, shows the motion of the center mount 70 to be small and thus negligible. This is due to the presence of the large mass 40. This mass reduces the motion of center mount 70 below any practical level of interference and thus is why it is said to be "infinite."

When operating the exciter 30 at high frequencies the LVDT is ineffective. Thus, while it was stated previously that the accelerometer and the LVDT were used to show that the center mount 70 was not moving, the primary reason for using the accelerometer 109 is to provide displacement measurement at frequencies beyond the effective range of the LVDT. Displacement at higher frequencies is very small because the power input at constant displacement depends upon the square of frequency. Also, above about 100 cycles per second the exciter 30 naturally develops constant acceleration over the higher frequency ranges. Thus, when used in combination, the measuring accelerometer 109 and the LVDT can cover from very low frequency to as high as 10 kilohertz. Calibration of accelerometer 109 can be accomplished as described previously in the case of LVDT 105.

The reason for using one accelerometer as a reference is to compensate for any phase shift of the transducer signals in the electronics used for readout. Thus, for example, a phase reading can be taken between the LVDT 105 or measuring accelerometer 109 and the reference accelerometer 107 the signal therefrom having been sent through the force readout instrumentation. Because displacement and acceleration are out of phase by Newton's laws of motion, any phase difference greater or less than 180° between these signals is an error due to the electronics used. This will affect the total phase readout when testing the sample. The phase of the electronics can be compensated for by adding or subtracting from the total phase angle. A periodic comparison of this phase may be made against a stable phase with a proof ring installed in the machine. Because damping in spring steel is low, the phase lag between force and displacement with a proof ring is considered to be zero. Hence any phase lag detected is the error due to electronics.

Because the dynamic tests utilizing the machine as above described are to be conducted over a wide range of temperature through use of the environmental shroud or chamber 50, temperature insulation becomes an important consideration with regard to not only the transducers but conduction of heat to and from the specimens themselves. Thus, strategic use is made of micarta insulation at several locations in the apparatus.

In FIG. 2, the face or head 32 of the exciter 30 is shown with layers 34, 35, 36 preferably of micarta, separated by steel spacer plates 37. The front face 38 of the shaker or exciter head is preferably aluminum. Face plate 38, steel plates 37, and the micarta layers 34, 35 and 36 are all bolted or otherwise secured to the shaker arm 33 to form the head 32. Each of the two accelerometers are fastened to the central portion of this arm 33. This forms an interlocking structure of maximum strength and rigidity while providing thermal and electrical isolation.

COMPRESSION TEST FIXTURE

As was stated previously, it is desirable to find dynamic properties in accordance with compression tests. Customer specifications coupled with the desirability that the machine according to the invention can be used to test more specimens in a given period of time than could be accomplished in the shear testing because of the time required for preparing the shear test specimens, demand that the test machine according to a preferred embodiment is designed so as to be easily adaptable for compression tests.

Referring now to FIGS. 7, 8 and 9, it is seen that between the exciter head 32 and the infinite mass 40 a testing fixture from that described in accordance with FIGS. 2–5 is shown. A bracket plate 81 is bolted or otherwise secured to the face of shaker head 32. The bracket plate 81 has an upwardly extending arm 81'. The bracket plate 81 is spaced from the face of the shaker head 32 by a spacer disk 82. A U-shaped bracket 83 is bolted to bracket plate 81 and extends substantially parallel to axis A. As seen particularly in FIG. 9, bracket 83 is positioned such that its two legs 85 extend substantially parallel to axis A while its end portion 86 traverses axis A and is normal thereto. Sinusoidal motion by shaker head 32 thus imparts sinusoidal motion to bracket plate 81 and bracket 83.

A stationary bracket 65 extends from the infinite mass 40 towards shaker head 32 with the end 66 thereof extending across axis A and between legs 85 of movable bracket 83. The legs 67 of bracket 65 are attached to a circular end plate 69 which is in turn attached to infinite mass 40. Also attached to this end plate 69 is an air spring bellows member generally indicated as 110. This bellows member 110 is secured to the outer face of end portion 86 of bracket 83. A specimen mounting plate 120 is secured to the interface of end portion 86 of bracket 83 by a suitable machine screw 112. A first piezo-electric crystal or washer 125 is disposed between the mounting plate 120 and the interface of end member 86 of bracket 83. A cylindrical test specimen 100 is held between mounting plate 120 and a stationary mounting plate 122. The stationary mounting plate is connected to an adapter plate 121 which contacts end member 66 of stationary bracket 65. A second piezo-electric load washer 127 is disposed between plate 122 and adapter 121. Each of the load washers 125 and 127 are provided with appropriate electrical leads 126. Load washers 125 and 127 can be calibrated by procedures similar to that described with regard to load cell 106.

Specimen 100 is preloaded to some specific preload condition by the force of bellows 110. Movement of shaker head 32 causes movement of bracket member 83 and movement of mounting plate 120 against specimen 100. The sinusoidal forces developed in specimen 100 are thus sensed by either or both transducers 125 or 127.

For measurement of displacement an LVDT 115 is mounted along the top portion of stationary bracket 65. The LVDT is substantially identical to the LVDT used in the shear test fixture and is herein referenced in FIG. 7 as 115. The LVDT is again buried in micarta (not shown) and the end 116 thereof contacts the head of a machine screw 94 threaded in the arm 81' at the top of bracket plate 81. LVDT 115 can be calibrated as LVDT 105 previously described.

Bracket 65 is preferably provided with an intermediate support generally indicated as 108. This support comprises a block of micarta insulation 118 on the top and bottom surfaces of end member 86 of bracket 83. Spacer shims 119 are provided adjacent each micarta block 118. Members 117 are a second micarta insulation and are adapted to receive a pair of bolts 114 passing through micarta 117, shims 119, and micarta 118 and securing these members to bracket 83.

A slideable connection 121 is connected to each arm 67 of bracket 65. Between each of these connections and micarta member 117 is a rubber shear block 123. Thus, when the preload is applied against end member 86 of movable bracket 83 sliding connections 121 are movable along arms 67 of bracket 65 to remove any undesirable stresses set up by this preload. Rubber shear blocks 123 function to insure rectilinear motion for pure axial compression of specimen 100.

Thus, as in the shear test, the compression test is used to record the force set up in the rubber by force transducers 125 and/or 127 and the displacement caused by exciter 32 by LVDT 115. Accelerometers 107 and 109 (not shown in FIGS. 7 through 9) are disposed in the shaker head 32 as previously described in connection with the shear test fixture. As in the shear test, at higher frequencies, a selected on of either accelerometer is used to determine displacement rather than LVDT 115. This is because for any given frequency dialed into the exciter 30 and for the amplitude of acceleration measured by the suitable or selected accelerometer there is one and only one amplitude of displacement applicable.

OPERATION

In each of the test setups described herein, suitable transducers are provided which record and sense displacement and force. As stated previously, the force is said to lag the displacement by a certain phase, or in other words stress lags strain by a phase angle which can be calculated when the deformation applied is sinusoidal.

The operation of the machine can best be described with reference to FIG. 6, showing the electronic circuitry in generalized block diagram form. This diagram can apply to either testing in compression or testing in shear.

The signal from the force transducer is typically amplified by passage through a suitable amplifier 22. The signal from the displacement transducer if it be the LVDT is fed through a carrier amplifier and demodulator 24. If the displacement transducer signal is from an accelerometer as mentioned previously then the signal is fed through a charge amplifier (not shown) similar to charge amplifier 22. These signals can then pass to a suitable oscilloscope 26 where stress may be plotted as a function of strain and the phase angle at any given time be calculated from this plot. This, however, may prove to be tedious work and phase may be calculated much more quickly and efficiently by use of a suitable phase meter, AC-DC converter, and five-digit counter. The oscilloscope can thus be used, if so desired, to monitor the force and displacement signals to quickly assess the purity of the signals and/or identify malfunctions. Using this latter technique, the signal from the charge amplifier and carrier amplifier and demodulator are passed through suitable band-pass filters 21 and 23 and into a phase meter 25 which calculates the phase lag between the force and displacement signal. Switch 27 is used to connect the phase meter through a DC voltage to frequency converter 19, to a five-digit counter readout device 29. Switch 27 also is used to alternately pass the displacement signal to the five-digit counter or the force signal to the five-digit counter 29 by use of switch 28 which permits passage of either of these signals through an AC to DC converter 31. Thus the counter 29 can readout force, displacement and the phase angle for the specimen being tested. The complex or total modulus is the ratio of force and displacement.

TEMPERATURE CONTROL

As discussed previously the machine is adapted to operate through a wide range of temperatures. A chamber or shroud such as 50 shown in FIG. 1 can surround the test specimen or specimens and the temperature within the chamber or shroud is altered by a temperature control system.

The shroud for the compression test is in many respects identical with the shroud 50 shown in FIG. 1 for the shear test. The basic differences between the chambers is that the compression test fixture requires a somewhat larger chamber.

The preferred temperature control systems for each test are different. The system for controlling temperature within the environmental chamber for compression testing is quite simple and is not shown in detail in the drawings. Temperature within the chamber can be changed by selective passage of hot and/or cold air into the chamber with temperature being monitored by a thermocouple inside the chamber. A pre-set controller receives signals from this thermocouple and meters hot or cold air or both in response to the thermocouple signal.

The preferred temperature control system for the shear test is however more involved due to the design of the shear test fixture above defined. A generalized partially schematic and partially block diagram is shown in FIG. 10 which depicts this preferred control system.

Cooling of the specimens 90 is accomplished by a supply of liquid nitrogen from a suitable source 130 through lines 132 and 136 directly to each of the yoke arms represented once again by reference numerals 64. Branch line 134 permits passage of liquid nitrogen to center mount 70. It is to be noted that both the yoke member and center mount are illustrated in FIG. 10 as being enclosed in environmental chamber or shroud 50.

Passage of this liquid nitrogen is controlled by a servo-valve 131 which receives signals through an amplifier 133 from a controller 140. Controller 140 receives signals through one of the leads from a thermo-couple 142, the other lead of which is connected to a strip chart recorder 150.

Heat is supplied by radiant heaters 51, 53, 55 and 56. Heaters 51 and 56 direct heat to yoke arms 64 while heaters 53 and 55 are directed at the top and bottom surfaces of center mount 70. Each heater 51, 53, 55 and 56 is connected to a typical power unit 151, 153, 155, and 156 respectively to vary the intensity of the heater lamps in response to signals from controllers 140, 143, 145. Controller 145 is a double pole double throw switch type controller to alternately control heaters 51 and 56.

Each controller is set at the desired test temperature and controls heating and/or cooling by the heaters and/or nitrogen supply as shown. In addition to thermcouple 142, thermcouple 144 and 146 pass signals to the various controllers and strip chart recorder 150 to sense departures from the pre-set temperature selections.

The preceding description is directed to preferred embodiments of a test machine which is:

1. a unique combination of mechanical, thermal and electronic components which permit dynamic conditions upon a rubber test specimen over wide ranges of technological interests,
2. possesses a high degree of accuracy and decision over important parameters such as displacement, frequency, temperature and force and
3. possesses a high degree of convenience to the operator.

The preferred embodiments described of course are subject to many modifications by those skilled in the art without such modifications falling outside the scope of the invention which is to be measured by the appended claims.

What is claimed is:

1. A device for dynamically testing visco-elastic materials comprising:
   A. a foundation
   B. a seismic pad floatably mounted on said foundation and
   C. a testing machine mounted on said seismic pad including:
      1. an electrodynamic vibration exciter adapted to transmit sinusoidal vibrations over a wide range of frequencies along a substantially horizontal axis,
      2. a mass of sufficient magnitude to remain substantially immovable in response to vibrations of said exciter axially spaced from said exciter and
      3. visco-elastic specimen mounting fixture between said exciter and said mass comprising:
         a. a movable mounting member connected to said exciter and having at least one planar surface adapted to engage a first surface of at least one test specimen and
         b. a stationary mounting member connected to said mass having at least one planar surface parallel to said planar surface of said movable mounting member and adapted to engage a second surface of said specimen opposite said first surface thereof, and
      4. a plurality of test condition indicators including:
         a. means for sensing relative displacement between said movable and stationary mounting members and
         b. means for sensing force by said specimen resisting said relative displacement between said movable and stationary mounting members.

2. The device defined in claim 1 wherein said means for sensing force by said specimen is a load cell operatively associated with said stationary mounting member.

3. The device defined in claim 2 wherein said means for sensing relative displacement between said movable and stationary mounting members is a linear variable differential transformer.

4. The device defined in claim 2 wherein said means for sensing relative displacement between said movable and stationary mounting members is an accelerometer.

5. The device defined in claim 1 wherein said means for sensing relative displacement between said movable and stationary mounting members is a linear variable differential transformer.

6. The device defined in claim 1 wherein said means for sensing relative displacement between said movable and stationary mounting members is an accelerometer.

7. The device as defined in claim 1 wherein said at least one planar surface of said movable mounting member and said at least one planar surface of said stationary mounting member are disposed substantially parallel to said substantially horizontal axis.

8. The device as defined in claim 7 further comprising an environmental chamber surrounding said mounting fixture and means to control the temperature within said chamber.

9. The device as defined in claim 1 wherein said at least one planar surface of said movable mounting member and said at least one planar surface of said stationary mounting member are disposed substantially perpendicular to said substantially horizontal axis.

10. The device as defined in claim 9 further comprising an environmental chamber surrounding said mounting fixture and means to control the temperature within said chamber.

\* \* \* \* \*